US008900088B2

(12) United States Patent
Yasuda et al.

(10) Patent No.: US 8,900,088 B2
(45) **Date of Patent: *Dec. 2, 2014**

(54) CLUTCH MECHANISM AND IMAGE FORMING APPARATUS INCLUDING SAME

(75) Inventors: Jun Yasuda, Chiba (JP); Kenji Tomita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 210 days.

This patent is subject to a terminal disclaimer.

(21) Appl. No.: 13/616,800

(22) Filed: Sep. 14, 2012

(65) Prior Publication Data

US 2013/0101314 A1 Apr. 25, 2013

(30) Foreign Application Priority Data

Oct. 19, 2011 (JP) ................................ 2011-229657
Jun. 20, 2012 (JP) ................................ 2012-139239

(51) Int. Cl.
*F16H 3/44* (2006.01)
*F16H 57/08* (2006.01)
*G03G 15/00* (2006.01)
*G03G 21/16* (2006.01)

(52) U.S. Cl.
CPC ...... *G03G 15/757* (2013.01); *G03G 2221/1657* (2013.01); *G03G 21/1647* (2013.01)
USPC .......................................... 475/311; 475/331

(58) Field of Classification Search
CPC ............ F16H 3/44; F16H 57/08; F16H 57/10
USPC ................................................. 475/311, 331
See application file for complete search history.

(56) References Cited

U.S. PATENT DOCUMENTS 7,329,203 B2 * 2/2008 Radinger et al. .............. 475/331
2007/0110464 A1 * 5/2007 Nakayama et al. ............. 399/45
2009/0017953 A1 1/2009 Uehara et al.
2013/0237366 A1 * 9/2013 Yasuda et al. ................ 475/280

FOREIGN PATENT DOCUMENTS

JP 2009-025611 2/2009
JP 2009-037198 2/2009
JP 2009-073648 4/2009

* cited by examiner

*Primary Examiner* — Edwin A Young
(74) *Attorney, Agent, or Firm* — Oblon, Spivak, McClelland, Maier & Neustadt, L.L.P.

(57) ABSTRACT

A clutch mechanism includes a transmission element rotatable in a first direction and a second direction opposite to the first direction, integrally including a plurality of projections including a first planar surface and a second planar surface at each side of the projections in the direction of rotation of the transmission element, a rotation restriction device including a first restriction surface and a second restriction surface to contact the first planar surface and the second planar surface, to lock rotation of the transmission element, and a moving device including an actuator to move the rotation restriction device to contact and separate from the transmission element. The first restriction surface contacts the first planar surface while the transmission element rotates in the first direction, and the second restriction surface contacts the second planar surface while the transmission element rotates in the second direction.

5 Claims, 9 Drawing Sheets

CLUTCH MECHANISM AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2011-229657, filed on Oct. 19, 2011, and 2012-139239, filed on Jun. 20, 2012, both in the Japan Patent Office, which are hereby incorporated herein by reference in their entirety.

BACKGROUND OF THE INVENTION

1. Field of the Invention

Exemplary aspects of the present invention generally relate to a clutch mechanism and an image forming apparatus including the clutch mechanism, and more particularly to an image forming apparatus such as a copier, a facsimile machine, a printer, or a multi-functional system including a combination thereof.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photoconductive drum); an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

There is demand for low-priced, energy-efficient, compact image forming apparatuses such as copiers, facsimile machines, printers, or multi-functional systems including a combination thereof. Various attempts have been made to reduce the cost and the size of the apparatus. For example, the number of drive sources such as the motors, etc., is reduced, and a planetary gear decelerator is employed to decelerate drive power from the drive sources in limited space.

To reduce consumption of power, clutch mechanisms employing various kinds of planetary gear mechanisms (hereinafter referred to as planetary gear clutch mechanisms) have been proposed. For example, JP-2009-073648-A proposes a combination of a planetary gear decelerator and a clutch mechanism for switching between forward and reverse rotation while achieving overall size reduction. In this configuration, however, in order to transmit torque from an input gear to an output gear, power of two solenoids needs to be regulated to change the direction of rotation of the output gear between forward, backward, and idle, hence complicating control of the device.

In view of the above, there is an unsolved need for a clutch mechanism using a planetary gear mechanism that can accommodate reliably bidirectional rotation of a drive unit disposed downstream from the planetary gear mechanism with ease.

BRIEF SUMMARY OF THE INVENTION

In view of the foregoing, in an aspect of this disclosure, there is provided an improved a clutch mechanism including a rotatable input element, an output element, a transmission element, a rotation restriction device, and a moving device. The rotatable input element receives torque. The output element outputs the torque. The transmission element is rotatable in a first direction and a second direction opposite to the first direction, and includes integrally a plurality of projections. The plurality of projections includes a first planar surface and a second planar surface at each side of the projections in the direction of rotation of the transmission element. The rotation restriction device includes a first restriction surface and a second restriction surface to contact the first planar surface and the second planar surface of the projections of the transmission element, respectively, to lock rotation of the transmission element. The moving device includes an actuator to move the rotation restriction device to contact and separate from the projections of the transmission element. The torque received by the input element is transmitted to downstream rotary devices in the direction of transmission of torque via the output element while the rotation restriction device engages the projections of the transmission element. The torque received by the input element is not transmitted to the downstream rotary devices via the output element while the rotation restriction device is disengaged from the projections of the transmission element. The first restriction surface contacts the first planar surface while the transmission element rotates in the first direction, and the second restriction surface contacts the second planar surface while the transmission element rotates in the second direction.

According to another aspect, an image forming apparatus includes an image bearing member, a developing device, and a drive transmission device. The image bearing member bears an electrostatic latent image on a surface thereof. The developing device develops the electrostatic latent image formed on the image bearing member using a developing agent to form a toner image. The developing device includes a developing agent bearing member to deliver the developing agent to the image bearing member. The drive transmission device includes the clutch mechanism and transmits a drive force to the image bearing member and to the developing agent bearing member.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF DISCLOSED EMBODIMENTS

Figure 1:
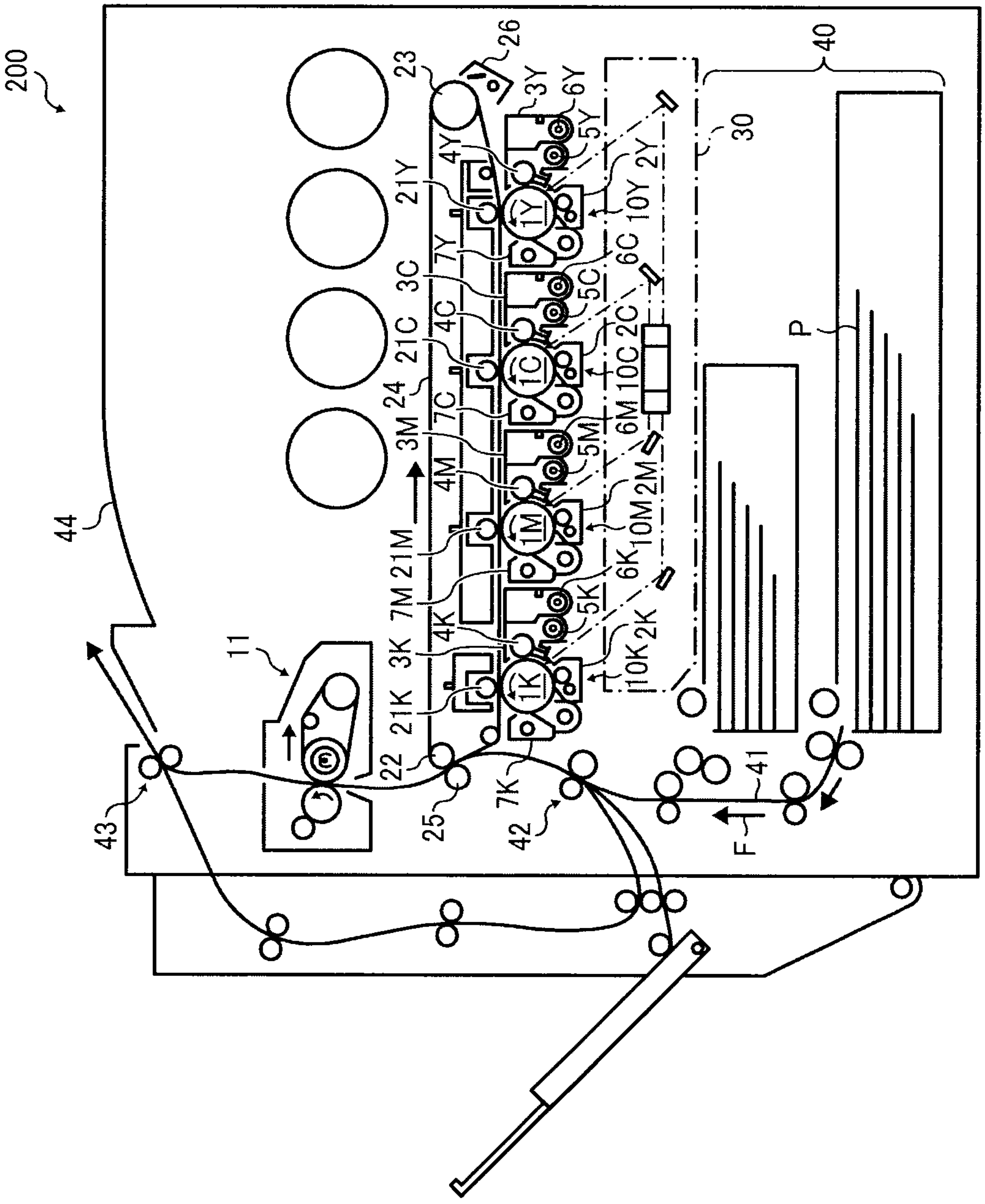
FIG. 1 is a schematic diagram illustrating a printer as an example of an image forming apparatus according to an illustrative embodiment of the present invention.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, and initially with reference to FIG. 1, a description is provided of a tandem-type color printer using an intermediate transfer method as an example of an image forming apparatus.

FIG. 1 is a schematic diagram illustrating an image forming apparatus 200 according to an illustrative embodiment of the present invention. As illustrated in FIG. 1, an image forming apparatus 200 includes image forming units 10K, 10M, 10C, and 10Y, one for each of the colors black, magenta, cyan, and yellow, respectively.

It is to be noted that the suffixes K, M, C, and Y denote colors black, magenta, cyan, and yellow, respectively. To simplify the description, the suffixes K, M, C, and Y indicating colors are omitted herein, unless otherwise specified.

The image forming apparatus 200 includes an intermediate transfer belt 24 formed into an endless loop and entrained about a plurality of rollers including a drive roller 22 facing a secondary transfer roller 25, a driven roller 23, and support rollers.

The image forming units 10Y, 10C, 10M, and 10K are disposed below the belt loop formed by the intermediate transfer belt 24 to contact the belt surface. The image forming units 10Y, 10C, 10M, and 10K are disposed in this order from the upstream side (where the driven roller 23 is disposed) in the direction of movement of the intermediate transfer belt 24. The image forming units 10Y, 10C, 10M, and 10K serving as an image bearing member include photosensitive drums 1Y, 1C, 1M, and 1K (which may be collectively referred to as photosensitive drums 1), respectively. Each of the photosensitive drums 1Y, 1C, 1M, and 1K is surrounded by various pieces of imaging equipment, such as a charging device 2, a developing unit 3, a drum cleaner 7, and so forth. To simplify the description, the suffixes indicating the colors are omitted.

When receiving image information from external devices such as a personal computer, the photosensitive drums 1 are rotated and the charging devices 2 charge uniformly the photosensitive drums 1. Subsequently, an optical writing unit 30 disposed below the photosensitive drums 1 illuminates the surface of the photosensitive drums 1 with laser light based on the image information from the external device, thereby forming an electrostatic latent image on the surface of the photosensitive drums 1. Then, the developing units 3 develop the electrostatic latent images on the surface of the photosensitive drums 1 with respective colors of toner, thereby forming visible images also known as toner images on the surface of the photosensitive drums 1.

As the photosensitive drums 1 rotate in a counterclockwise direction indicated by an arrow, the toner images of different colors formed on the surface thereof come to the position opposite primary transfer rollers 21Y, 21C, 21M, and 21K via the intermediate transfer belt 24 which rotates endlessly in a clockwise direction. The primary transfer rollers 21Y, 21C, 21M, and 21K are disposed inside the loop formed by the intermediate transfer belt 24 facing the photosensitive drums 1Y, 1C, 1M, and 1K, respectively. A primary transfer bias is applied to the primary transfer rollers 21 so that the toner images on the surface of the photosensitive drums 1 are transferred primarily onto the intermediate transfer belt 24 such that they are superimposed one atop the other, thereby forming a composite toner image on the intermediate transfer belt 24 in a process known as a primary transfer process.

The composite toner image primarily transferred onto the intermediate transfer belt 24 is delivered to a secondary transfer position at which the secondary transfer roller 25 contacts the drive roller 22 via the intermediate transfer belt 24 while the intermediate transfer belt 24 moves endlessly.

As for feeding a recording medium P, multiple recording media sheets are stored in a sheet feeder 40 disposed below the optical writing unit 30. The recording medium P is fed to a sheet delivery path 41 indicated by arrow F in appropriate timing. When the recording medium P arrives at a pair of registration rollers 42, rotation of the registration rollers 42 stops temporarily and starts to rotate again in appropriate timing such that the recording medium P is aligned with the toner image formed on the intermediate transfer belt 24. Due to a secondary transfer bias applied to the secondary transfer roller 25, the composite toner image on the intermediate transfer belt 24 is transferred onto the recording medium P.

The recording medium P bearing the composite toner image on the surface thereof is delivered to a fixing device 11 along the sheet delivery path 41. The fixing device 11 is disposed downstream from the secondary transfer position in the direction of sheet delivery. The composite toner image on the recording medium P is fixed due to heat and pressure applied by the fixing device 11. After the toner image is fixed on the recording medium P, the recording medium P is output onto a sheet output tray 44 from a sheet output opening 43.

Residual toner not having been transferred from the photosensitive drums 1 onto the intermediate transfer belt 24 during the primary transfer process is removed by the drum cleaner 7 disposed downstream from the primary transfer position in the direction of rotation of the photosensitive drum 1. Residual toner not having been transferred from the intermediate transfer belt 24 onto the recording medium P during the secondary transfer process is removed by a belt cleaning device 26 in preparation for the subsequent imaging process.

A drive motor serving as a drive source may be provided to each of the photosensitive drums 1 (1K through 1Y), developing rollers 4 (4K through 4Y), and developing agent mixing screws 5 and 6 (5K through 5Y and 6K through 6Y) in the image forming unit 10 (10K through 10Y). However, providing a drive motor to each device hinders efforts to achieve the low-cost, energy-efficient image forming apparatuses for which there is market demand.

In view of the above, according to an illustrative embodiment, in the image forming apparatus 200, a single drive motor transmits torque to the plurality of devices in the image forming units 10. More specifically, a single drive motor drives the plurality of image forming units 10Y, 10C, and 10M. The image forming unit 10K for the color black, which is used most frequently, is driven by a different drive motor.

In the image forming units 10Y through 10K, the photosensitive drums 1, the developing rollers 4, and developing agent mixing screws 5 and 6 are rotated by a gear train. The developing agent mixing screws 5 and 6 are rotated in sync with rotation of the developing roller 4. It is to be noted that the drive motor for the image forming unit 10K includes a gear train capable of transmitting torque to the drive roller 22 that rotates the intermediate transfer belt 24. As will be described in detail later, the torque transmission system according to the illustrative embodiment can reduce cost and power consumption of the image forming apparatus.

According to the illustrative embodiment, in the image forming units 10, the developing rollers 4 deteriorate faster than the photosensitive drums 1 do. Thus, it is desirable to rotate the developing rollers 4 less frequently.

Furthermore, after image forming operation, some developing agent may remain on a portion of the developing agent mixing screws 5 and 6, exposing from the surface of the developing agent. Such a residual developing agent on the developing agent mixing screws 5 and 6 above the surface of the developing agent tends to form multiple lumps. These lumps of residual developing agent condense more easily than the developing agent below the surface of the developing agent. If the image forming operation is repeated with the lumps of residual developing agent, the lumps condense and grow even larger. As a result, image defects such as white lines appear on a resulting output image.

In order to prevent such image defects, after the image forming operation, the developing agent mixing screws 5 and 6 in the developing unit 3 are rotated in the direction opposite to the direction in which they rotate during image forming operation to remove the lumps of the residual developing agent on the developing agent mixing screws 5 and 6 exposing from the upper surface of the developing agent. With this configuration, condensation of the lumps is prevented, thereby suppressing accumulation of the lumps.

In each of the image forming units 10 of the image forming apparatus 200 according to the illustrative embodiment, the gear train for the photosensitive drum 1 is separated from the gear train for the developing roller 4, and the developing agent mixing screws 5 and 6 of the developing unit 3. The gear train that transmits torque to the developing roller 4, and the developing agent mixing screws 5 and 6 in the developing unit 3 is provided with a planetary gear clutch mechanism 100 that accommodates bidirectional rotation.

With this configuration, driving of the developing roller 4 is kept to a minimum while the developing agent mixing screws 5 and 6 are rotated in both directions to prevent the residual developing agent from sticking thereto and hence concentrating thereon.

Next, with reference to FIGS. 2A through 3B, a description is provided of the gear train and the planetary gear clutch mechanism 100 in the image forming units 10 according to an illustrative embodiment of the present invention. The planetary gear clutch mechanisms 100 employed in each of the image forming units 10 have the same configuration. Thus, the description is provided of the planetary gear clutch mechanism 100 employed in the image forming unit 10K as a representative example of the planetary gear clutch mechanisms. The suffixes K, M, C, and Y indicating colors are omitted herein unless discrimination therebetween is necessary.

According to the illustrative embodiment, three elements of rotation of the planetary gear mechanism, that is, an input element, an output element, and a fixed element, are assigned such that the input is an outer gear 101, the output is a carrier 104 holding planetary gears 105, and the sun gear 111 is held stationary (fixed). In other words, the outer gear 101 serves as a drive transmission member at the input side. The sun gear 111 serves as a drive transmission member held stationary. The carrier 104 serves as a drive transmission member at the output side. However, the present invention is not limited to the configuration described above. Thus, for example, the input may be the outer gear 101, the output may be the sun gear 111, and the carrier 104 holding the planetary gears 105 may be held stationary. In other words, the outer gear 101 serves as a drive transmission member at the input side, the carrier 104 serves as a drive transmission member held stationary, and the sun gear 111 serves as a drive transmission member at the output side.

Figure 2A:
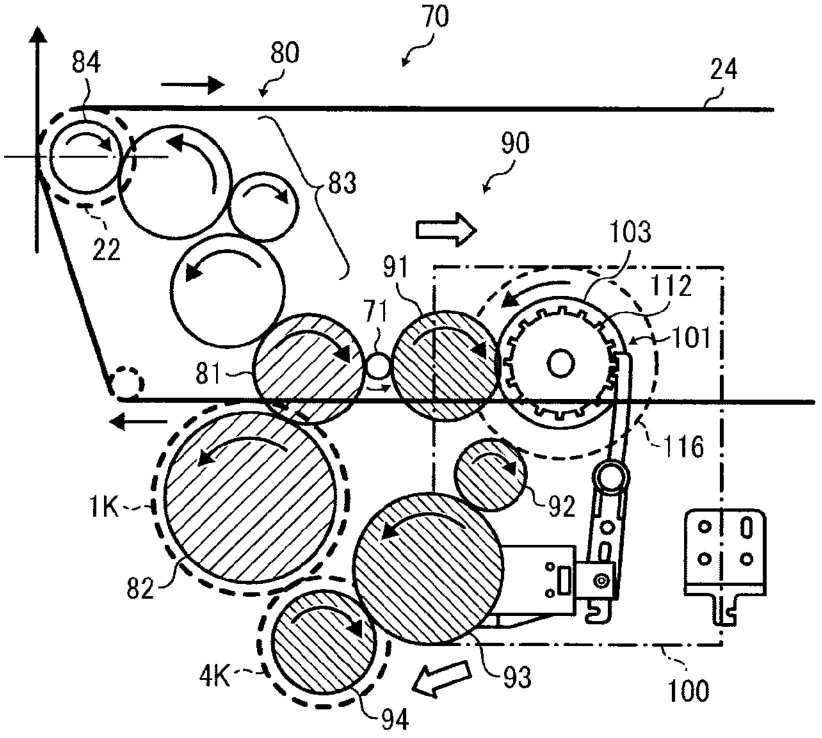
FIG. 2A is a schematic diagram illustrating a drive gear train assembly upon normal rotation of an image forming unit employed in the image forming apparatus when a planetary gear clutch mechanism is driven.
Figure 2B:
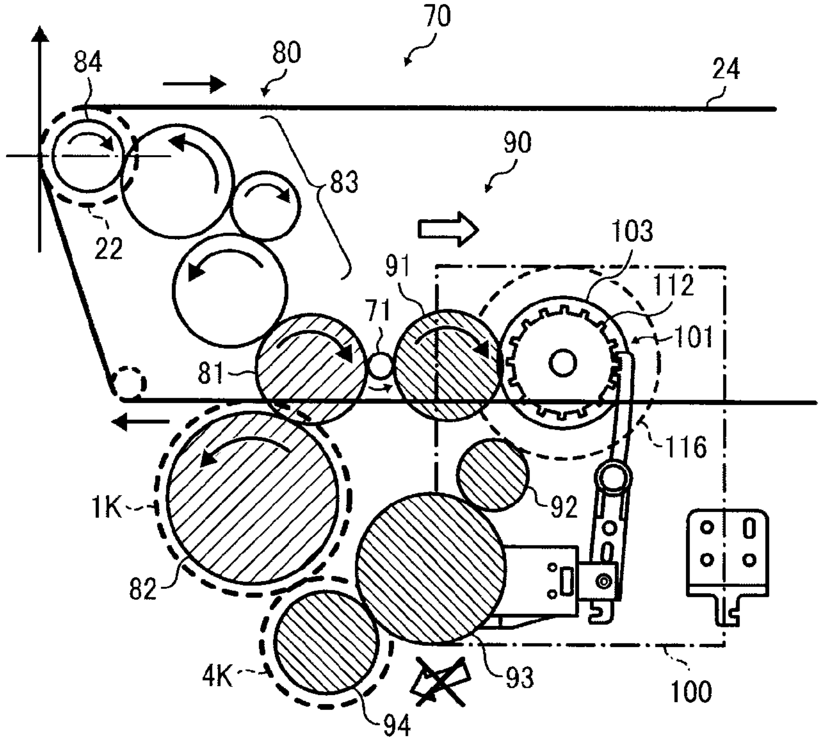
FIG. 2B is a schematic diagram illustrating the drive gear train assembly upon normal rotation of the image forming unit when the planetary gear clutch mechanism is interrupted.
Figure 3A:
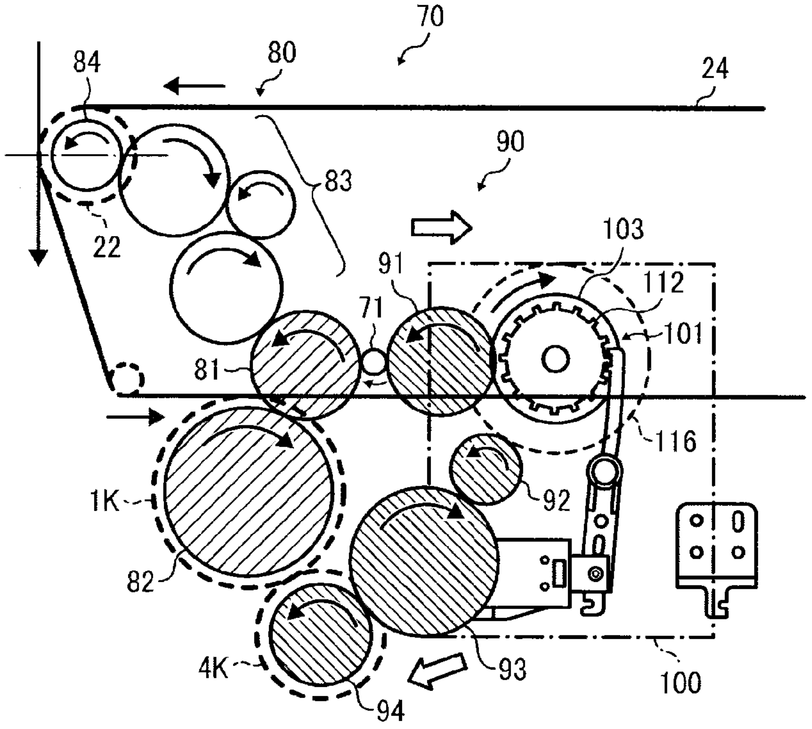
FIG. 3A is a schematic diagram illustrating the drive gear train assembly upon reverse rotation of the image forming unit when the planetary gear clutch mechanism is driven.
Figure 3B:
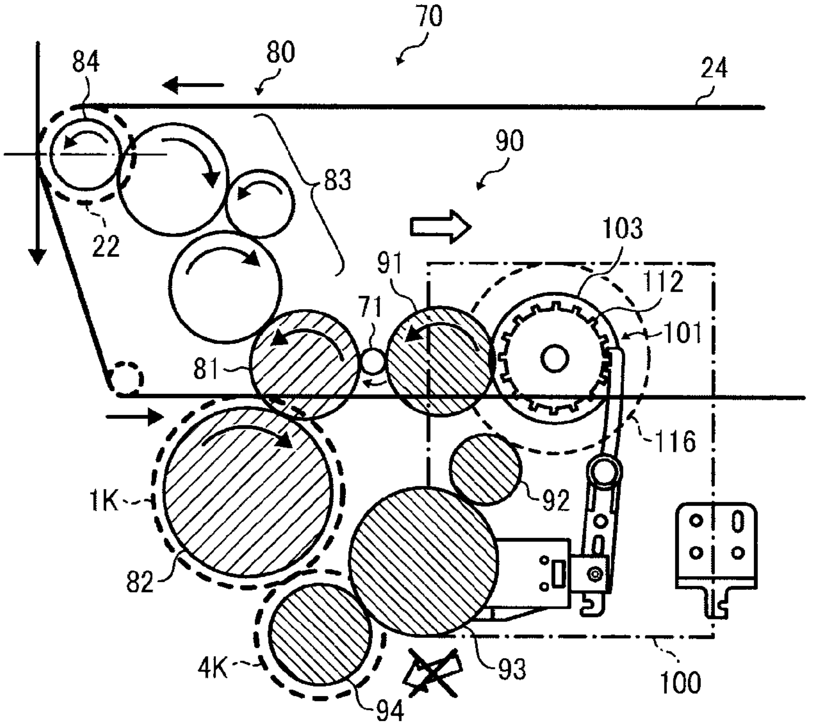
FIG. 3B is a schematic diagram illustrating the drive gear train assembly upon reverse rotation of the image forming unit when the planetary gear clutch mechanism is interrupted.

With reference to FIGS. 2A through 3B, a description is provided of a drive gear train assembly 70 for the image forming unit 10K. FIG. 2A is a schematic diagram illustrating the drive gear train assembly 70 upon normal rotation of the image forming unit 10K when the planetary gear clutch mechanism 100 is driven. FIG. 2B is a schematic diagram illustrating the drive gear train assembly 70 upon normal rotation of the image forming unit 10K when the planetary gear clutch mechanism 100 is interrupted. FIG. 3A is a schematic diagram illustrating the drive gear train assembly 70 upon reverse rotation of the image forming unit 10K when the planetary gear clutch mechanism 100 is driven. FIG. 3B is a schematic diagram illustrating the drive gear train assembly 70 upon reverse rotation of the image forming unit 10K when the planetary gear clutch mechanism 100 is interrupted.

It is to be noted that FIGS. 2A through 3B illustrate a cross section of the planetary gear clutch mechanism 100 as viewed from a ratchet 112 to the outer gear 101. The ratchet 112 is constituted as a single integrated unit with the sun gear 111. Broken lines in FIGS. 2A through 3B indicate an external shape of an output gear 116, the drive roller 22, and the developing roller 4K disposed at a proximal side.

As illustrated in FIG. 2A, the drive gear train assembly 70 includes a photosensitive drum drive gear train 80 for rotating the photosensitive drum 1K shown at the left hand side in FIG. 2A and a developing roller drive gear train 90 for rotating the developing roller 4K shown at the right hand side. The photosensitive drum drive gear train 80 includes an idler gear train 83. The idler gear train 83 includes a plurality of idler gears that transmit torque to a drive roller gear 84 connected to the drive roller 22 that rotates the intermediate transfer belt 24.

The developing roller drive gear train 90 includes the planetary gear clutch mechanism 100. Furthermore, gears that rotate the developing agent mixing screws 5 and 6 are disposed downstream from a developing roller drive gear 94 in a direction of transmission of force. The developing roller drive gear 94 rotates the developing roller 4.

As compared with the image forming unit 10K, in the image forming units 10Y, 10C, and 10M, the photosensitive drum drive gear train 80 does not include the idler gear train 83 and the drive roller gear 84. Furthermore, a drive gear that transmits a drive force to the photosensitive drum drive gear train 80 and the developing roller drive gear train 90 is connected to motor drive gear trains (not illustrated) for the image forming units 10Y, 10C, and 10M.

Except for the above differences, the configurations of the photosensitive drum drive gear train 80 for transmitting torque to the photosensitive drums 1Y, 1C, and 1M, and the developing roller drive gear train 90 for the image forming units 10Y, 10C, and 10M are the same as that of the image forming unit 10K.

As illustrated in FIG. 2A, the photosensitive drum drive gear train 80 of the image forming unit 10K includes a first photosensitive drum gear 81 that meshes with a drive gear 71, and a drive gear 82 that meshes with the first photosensitive drum gear 81 from the oblique left substantially below the first photosensitive drum gear 81. The first photosensitive drum gear 81 is disposed at the left side of the drive gear 71. The photosensitive drum drive gear train 80 includes the idler gear train 83 that meshes with the first photosensitive drum gear 81 from the oblique left substantially above the first photosensitive drum gear 81.

The developing roller drive gear train 90 includes the planetary gear clutch mechanism 100. The planetary gear clutch mechanism 100 includes a first developing roller gear 91 meshing with the drive gear 71 and an input gear device that meshes with the first developing roller gear 91. The first developing roller gear 91 is disposed at the right side of the drive gear 71. Furthermore, the developing roller drive gear train 90 includes a second developing roller gear 92 and a third developing roller gear 93. The second developing roller gear 92 meshes with the output gear 116. The third developing roller gear 93 meshes with the second developing roller gear 92. Furthermore, the developing roller drive gear train 90 includes a developing roller drive gear 94 that meshes with the third developing roller gear 93 to rotate the developing roller 4.

In a force transmission state, the externally toothed output gear 116 and an external teeth portion 103 formed on the outer circumference of the outer gear 101 serving as the input gear for the planetary gear clutch mechanism 100 rotate in the same direction no matter which direction the developing roller 4 is rotated.

As illustrated in FIG. 2A, in a case in which the photosensitive drum 1 and the developing roller 4 are rotated in a normal rotation direction, which is a direction of rotation during image forming operation, while the planetary gear clutch mechanism 100 is in the force transmission state, the drive gear 71 rotates in the counterclockwise direction. As the drive gear 71 rotates in the counterclockwise direction, the drive roller gear 84 of the photosensitive drum drive gear train 80 rotates in the clockwise direction as the normal rotation direction via the first photosensitive drum gear 81 and the idler gear train 83. The photosensitive drum drive gear 82 rotates in the counterclockwise direction as the normal rotation direction via the first photosensitive drum gear 81.

In the developing roller drive gear train 90, the first developing roller gear 91 rotates in the clockwise direction, and the outer gear 101 serving as the input gear of the planetary gear clutch mechanism 100 rotates in the counterclockwise direction. The output gear 116 of the planetary gear clutch mechanism 100 rotates in the counterclockwise direction as the normal rotation direction. The counterclockwise rotation of the output gear 116 is transmitted to the developing roller drive gear 94 via the second developing roller gear 92 and the third developing roller gear 93, thereby rotating the developing roller drive gear 94 in the clockwise direction as the normal rotation direction.

As illustrated in FIG. 2B, in a case in which the planetary gear clutch mechanism 100 is in an interrupted state, the torque of the outer gear 101 in the counterclockwise direction is not transmitted to the output gear 116 of the planetary gear clutch mechanism 100. As a result, the output gear 116 does not rotate in either direction. That is, as the drive motor rotates in the normal rotation direction while the planetary gear clutch mechanism 100 is in the interrupted state, the intermediate transfer belt 24 and the photosensitive drum 1 are rotated in the normal rotation direction. However, the developing roller 4, and the developing agent mixing screw 5 and 6 in the developing unit 3 do not rotate in either direction.

As illustrated in FIG. 3A, in a case in which the photosensitive drum 1 and the developing roller 4 are rotated in a reverse rotation direction, which is the rotation direction opposite to the direction of rotation during image forming operation (normal rotation direction), while the planetary gear clutch mechanism 100 is in the force transmission state, the drive gear 71 rotates in the clockwise direction. As the drive gear 71 rotates in the clockwise direction, the drive roller gear 84 of the photosensitive drum drive gear train 80 rotates in the counterclockwise direction via the first photosensitive drum gear 81 and the idler gear train 83. The photosensitive drum drive gear 82 rotates in the clockwise direction as the reverse rotation direction via the first photosensitive drum gear 81.

In the developing roller drive gear train 90, the first developing roller gear 91 rotates in the counterclockwise direction, and the outer gear 101 serving as the input gear of the planetary gear clutch mechanism 100 rotates in the clockwise direction. The output gear 116 of the planetary gear clutch mechanism 100 rotates in the clockwise direction as the reverse rotation direction. The clockwise rotation of the output gear 116 is transmitted to the developing roller drive gear 94 via the second developing roller gear 92 and the third developing roller gear 93, thereby rotating the developing roller drive gear 94 in the counterclockwise direction as the reverse rotation direction.

As illustrated in FIG. 3B, in a case in which the planetary gear clutch mechanism 100 is in the interrupted state, the torque of the outer gear 101 in the clockwise direction is not transmitted to the output gear 116 of the planetary gear clutch mechanism 100. As a result, the output gear 116 does not rotate in either direction. That is, as the drive motor rotates in the reverse direction while the planetary gear clutch mechanism 100 is in the interrupted state, the intermediate transfer belt 24 and the photosensitive drum 1 are rotated in the reverse direction. However, the developing roller 4, and the developing agent mixing screw 5 and 6 in the developing unit 3 do not rotate in either direction.

Figure 4:
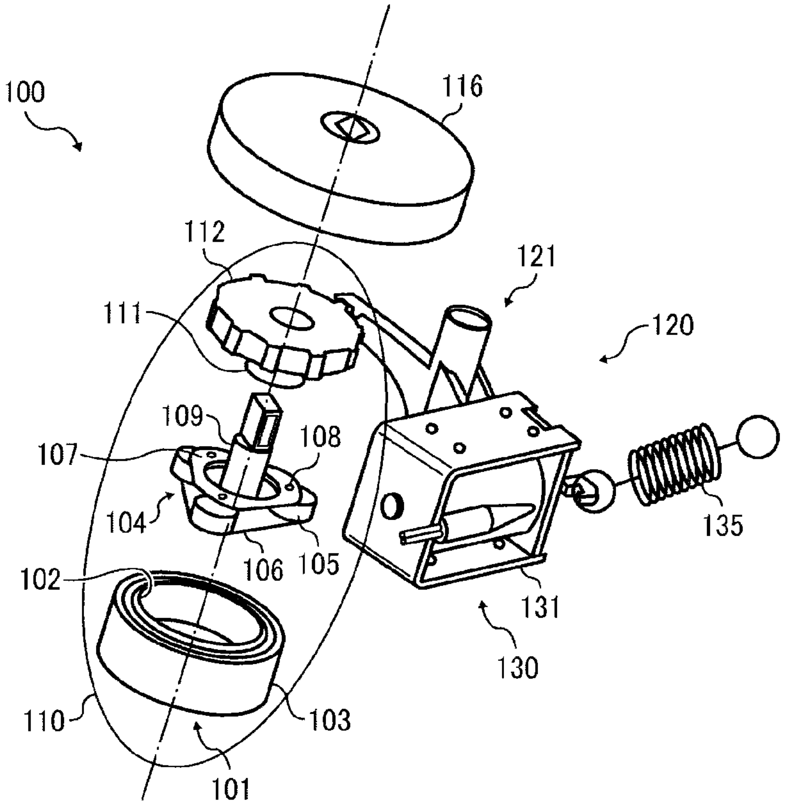
FIG. 4 is a perspective view schematically illustrating the planetary gear clutch mechanism.

With reference to FIG. 4, a description is provided of the planetary gear clutch mechanism 100 capable of accommodating bidirectional rotation according to an illustrative embodiment of the present invention. FIG. 4 is a perspective view schematically illustrating the planetary gear clutch mechanism 100.

As illustrated in FIG. 4, the planetary gear clutch mechanism 100 includes the output gear 116 and a planetary gear unit 110, a rotation regulator 120, and a moving unit 130 serving as a switching mechanism. The planetary gear unit 110 includes the ratchet 112 serving as a rotation restriction target, rotation of which is regulated by the rotation regulator 120. The rotation regulator 120 includes a lever 121 serving as a rotation regulating member. The moving unit 130 includes an elastic member 135 and an actuator 131 that enables the lever 121 to engage and disengage the ratchet 112.

The planetary gear unit 110 of the planetary gear clutch mechanism 100 includes the outer gear 101 as the input gear, three planetary gears 105, the carrier 104, and the sun gear 111. The carrier 104 holds three planetary gears 105 such that the planetary gears 105 rotate themselves and revolve around the sun gear 111. The sun gear 111 meshes with the planetary gears 105. The carrier 104 includes the carrier itself holding the planetary gears 105 and an output shaft 109 that connects to the output gear 116 for transmitting torque of the carrier 104 to the drive unit downstream therefrom such that the carrier 104 and the output gear 116 operate together. The ratchet 112 is provided to the sun gear 111 to move together with the sun gear 111. The outer gear 101, the carrier 104, the sun gear 111, the ratchet 112, the output shaft 109, and the output gear 116 are coaxial.

According to the present illustrative embodiment, while torque is transmitted to the external teeth portion 103 formed on the outer circumference of the outer gear 101 via the first developing roller gear 91, the planetary gears 105 meshing with an internal teeth portion 102 of the outer gear 101 rotate always. However, the carrier 104 holding the planetary gears 105 rotates under certain conditions. As will be described in detail, according to the present illustrative embodiment, the planetary gear clutch mechanism 100 can transmit torque to the drive unit downstream from the planetary gear unit 110 and interrupt the transmission under certain conditions. Thus, the output gear 116 rotates under certain conditions.

Next, a description is provided of transmission and interruption of the drive force using the planetary gear clutch mechanism 100.

Figure 5:
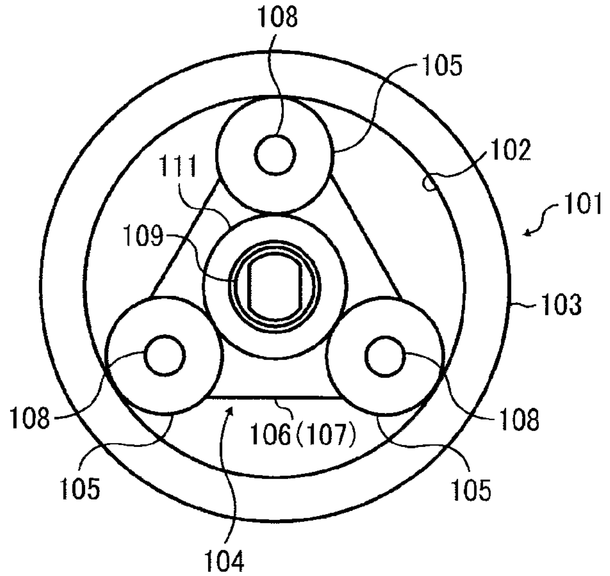
FIG. 5 is a schematic diagram illustrating the planetary gear clutch mechanism to explain a principle of movement of the planetary gear clutch mechanism.

As illustrated in FIG. 5, the drive transmission part of the planetary gear unit 110 consists of three kinds of gears: the internal teeth portion 102 of the outer gear 101, the planetary gears 105, and the sun gear 111. The rotary elements that can rotate coaxially on the same rotary shaft as the outer gear 101 include the outer gear 101, the carrier 104, and the sun gear 111. The carrier 104 holds the planetary gears 105 such that the planetary gears 105 rotate and revolve.

As is generally the case for a planetary gear set, the planetary gear unit 110 comprises a combination of three rotary elements: an input element, an output element, and a stationary element, rotation of which is interrupted, thereby enabling transmission of force. According to the present illustrative embodiment, in the planetary gear unit 110, the input is the outer gear 101, the output is the carrier 104, and the sun gear 111 is held stationary. With this configuration, force is transmitted in the planetary gear unit 110.

When the sun gear 111 is held stationary, that is, rotation thereof is interrupted, torque is transmitted to the drive unit downstream from the planetary gear unit 110. By contrast, when the interruption of rotation of the sun gear 111 is canceled, allowing the sun gear 111 to freely rotate, rotation of the carrier 104 stops and torque is not transmitted to the drive unit downstream from the planetary gear unit 110.

It is to be noted that the external teeth portion 103 is formed coaxially on the outer circumference of the outer gear 101 and meshes with the first developing roller gear 91, thereby transmitting torque to the outer gear 101.

As illustrated in FIG. 4, the carrier 104 includes a base plate 106, a pin 108, and an end plate 107. The output gear 116 is disposed closer to the end plate 107 than to the base plate 106. The pin 108 is supported by the base plate 106 at one end thereof and holds rotatably the planetary gears 105. The other end of the pin 108 is supported by the end plate 107. The output shaft 109 that transmits torque to the output gear 116 is connected to the base plate 106. The cross-section of the portion of the output shaft 109 fitted with the output gear 116 has an anti-rotation structure so that torque is reliably transmitted to the output gear 116.

The end plate 107 includes a hole into which the sun gear 111 rotatably fits. The ratchet 112 and the sun gear 111 are coaxial and constituted as a single integrated member. The ratchet 112 includes a hole through which the output shaft 109 is inserted. The output shaft 109 is rotatable in the hole of the ratchet 112.

Figure 6:
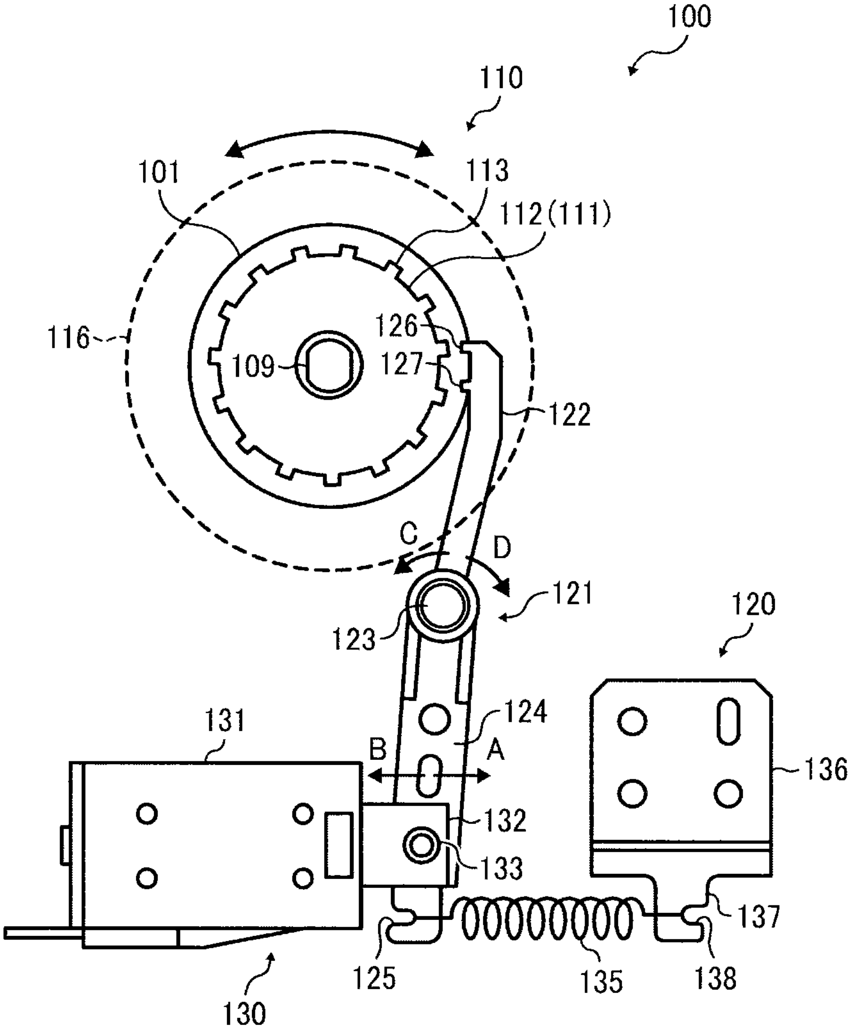
FIG. 6 is a schematic diagram illustrating the planetary gear clutch mechanism and a switching unit that locks and unlocks rotation of a sun gear.

Next, with reference to FIG. 6, a description is provided of a switching mechanism that locks and unlocks rotation of the sun gear 111. FIG. 6 is a schematic diagram illustrating the planetary gear clutch mechanism 100 and the switching mechanism that locks and unlocks rotation of the sun gear 111.

As illustrated in FIG. 6, the ratchet 112, rotation of which is regulated, and the sun gear 111 are coaxial and constituted as a single integrated member. The ratchet 112 includes a plurality of teeth (projections) 113 provided equally spaced around the circumferential surface of the ratchet 112. The teeth 113 mesh with a normal rotation restriction projection 126 and a reverse rotation restriction projection 127 formed on the lever 121. The rotation regulator 120 that regulate rotation of the ratchet 112, that is, rotation of the sun gear 111, includes the lever 121 and a support shaft 123 that pivotally supports the lever 121.

The lever 121 includes an output portion 122 at one end thereof and an input portion 124 at the opposite end of the lever 121 relative to the support shaft 123. The output portion 122 is formed from the support shaft 123 to the leading end of the lever 121 facing the ratchet 112. The input portion 124 is formed from the support shaft 123 to the opposite end of the lever 121. The output portion 122 of the lever 121 includes two projections: the normal rotation restriction projection 126 and the reverse rotation restriction projection 127, one of which at any given time meshes with the tooth 113 of the ratchet 112.

The moving unit 130 includes the actuator 131 and the elastic member 135. The moving unit 130 enables the projections 126 and 127 of the output portion 122 of the lever 121 to engage and separate from the teeth 113 of the ratchet 112. The actuator 131 includes a cylindrical plunger 132 that moves substantially in a horizontal direction in FIG. 6, as power is turned on and off. The tip of the plunger 132 includes an engaging pin 133 that fits into a hole formed in the input portion 124 of the lever 121. Horizontal movement of the plunger 132 enables the lever 121 to rotate about the support shaft 123.

The lower tip of the input portion 124 of the lever 121 includes a notch 125 that directly supports one end of the elastic member 135. The opposite end of the elastic member 135 is attached to a notch 138 provided to an elastic member holder 137. The elastic member 135 pulls the notch 125 of the input portion 124 in the direction of arrow A, that is, to the right in FIG. 6.

With this configuration, when the actuator 131 of the moving unit 130 is turned off, the plunger 132 is moved by the elastic member 135 in the direction of arrow A in FIG. 6. Accordingly, the lever 121 rotates about the support shaft 123 in the counterclockwise direction indicated by an arrow C. At least one of planes of the projections at the tip of the output portion 122 of the lever 121 contacts a plane of the tooth 113 of the ratchet 112 so that rotation of the ratchet 112 is locked.

By contrast, in a case in which the actuator 131 is turned on, the plunger 132 moves in the direction of arrow B, that is, to the left in FIG. 6, causing the lever 121 to rotate about the support shaft 123 in the clockwise direction indicated by an arrow D. As a result, the projection at the tip of the output portion 122 of the lever 121 separates from the tooth 113 of the ratchet 112, thereby allowing the ratchet 121 to rotate.

Figure 7A:
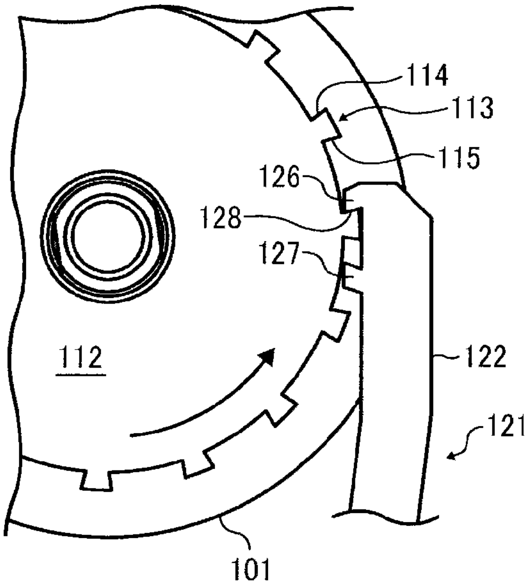
FIG. 7A is a partially enlarged diagram schematically illustrating engagement of the ratchet and a regulation lever during normal rotation.

In order to rotate the developing roller 4 in the clockwise direction which is the normal rotation direction as illustrated in FIG. 2A, the counterclockwise rotation of the sun gear 111, that is, the ratchet 112, is interrupted as illustrated in FIG. 7A. Rotation of the ratchet 112 is locked. More specifically, an upstream surface 114 of the tooth 113 of the ratchet 112 in the direction of clockwise rotation meshes with a normal rotation restriction surface 128 of a normal rotation restriction projection 126 formed at the tip of the output portion 122 of the lever 121.

Figure 7B:
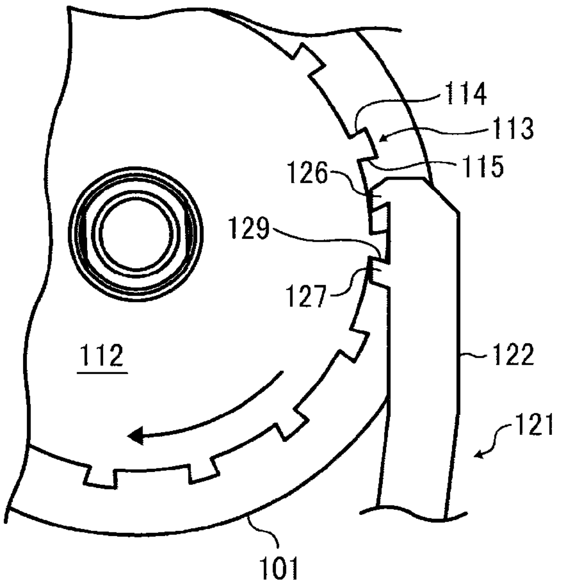
FIG. 7B is a partially enlarged diagram schematically illustrating engagement of the ratchet and the regulation lever during reverse rotation.

By contrast, in order to rotate the developing roller 4 in the counterclockwise direction which is the reverse rotation direction as illustrated in FIG. 3A, the clockwise rotation of the sun gear 111, that is, the ratchet 112, is interrupted as illustrated in FIG. 7B. Rotation of the ratchet 112 is locked. More specifically, a downstream surface 115 of the tooth 113 of the ratchet 112 in the direction of clockwise rotation meshes with a reverse rotation restriction surface 129 of the reverse rotation restriction projection 127 at the tip of the output portion 122 of the lever 121.

The surface profile of the tooth 113 of the ratchet 112 and the projections 126 and 127 of the output portion 122 of the lever 121 contacting the tooth 113 needs to be optimized such that the downstream side of the planetary gear clutch mechanism 100 of the developing roller drive gear train 90 in the direction of force transmission can accommodate bidirectional rotation. This is because a very large force (friction) is constantly required to completely stop the ratchet 112 provided to the sun gear 111 if the contact area of the tooth 113 with the surface of the projection of the lever 121 is small, like a point contact.

In view of the above, in order to reliably stop the ratchet 112, according to the illustrative embodiment, the elastic member 135 is used to move the surface of the projections 126 and 127 of the lever 121 to engage the respective surface of the tooth 113 of the ratchet 112. Furthermore, to reduce cost, the low-power actuator 131 is employed to move the elastic member 135.

In order to move the lever 121, the elastic member 135 needs to be stretched using the pull-in force of the low-power actuator 131. If an elastic modulus of the elastic member 135 is large, the low-power actuator 131 cannot pull in the elastic member 135. For this reason, the elastic modulus of the elastic member 135 needs to be small. Thus, the elastic member 135 is not sufficient enough to stop rotation of circular objects such as the ratchet 112 when the contact area of two objects is small like a point contact.

In view of the above, in order to reliably lock the rotation of the ratchet 112, the tooth 113 of the ratchet 112 and the projection of the lever 121 need to engage such that the plane of the tooth 113 contacts the respective plane of the projection of the lever 121 over a plane.

Figure 8:
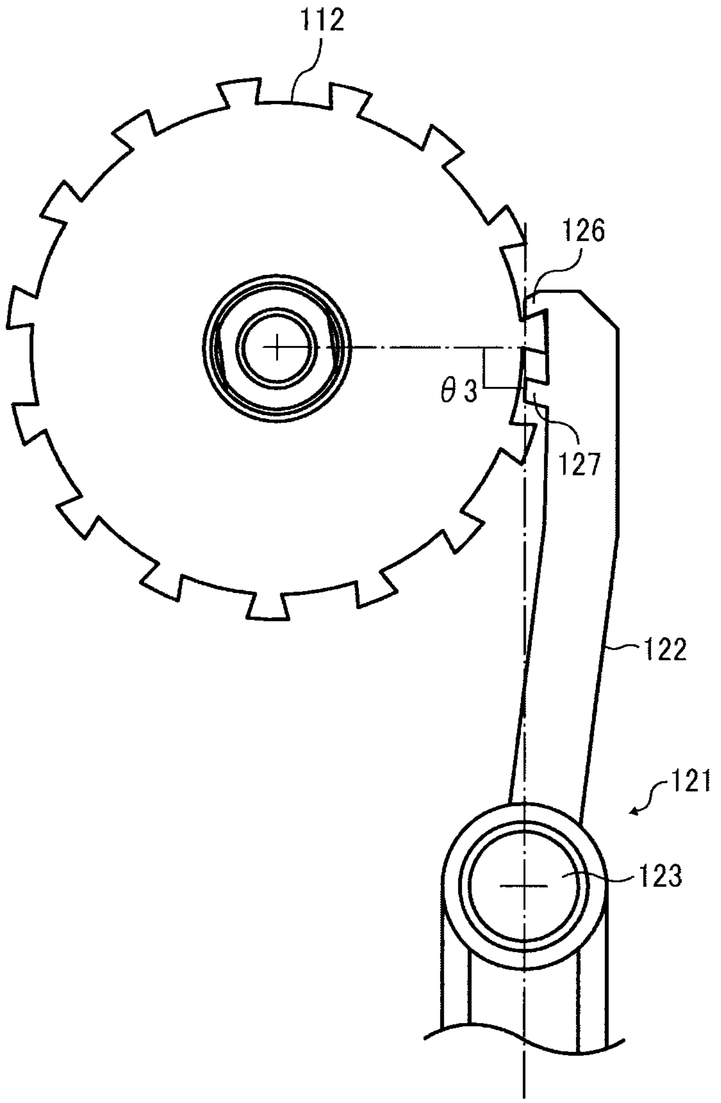
FIG. 8 is a schematic diagram schematically illustrating the ratchet and the regulation lever contacting one gear tooth of the ratchet.

With reference to FIG. 8, a description is provided of the surface profile of the tooth 113 and the projections 126 and 127 of the lever 121. FIG. 8 is a schematic diagram schematically illustrating the ratchet 112 and the regulation lever 121 contacting one of gear teeth 113 of the ratchet 112.

Figure 9A:
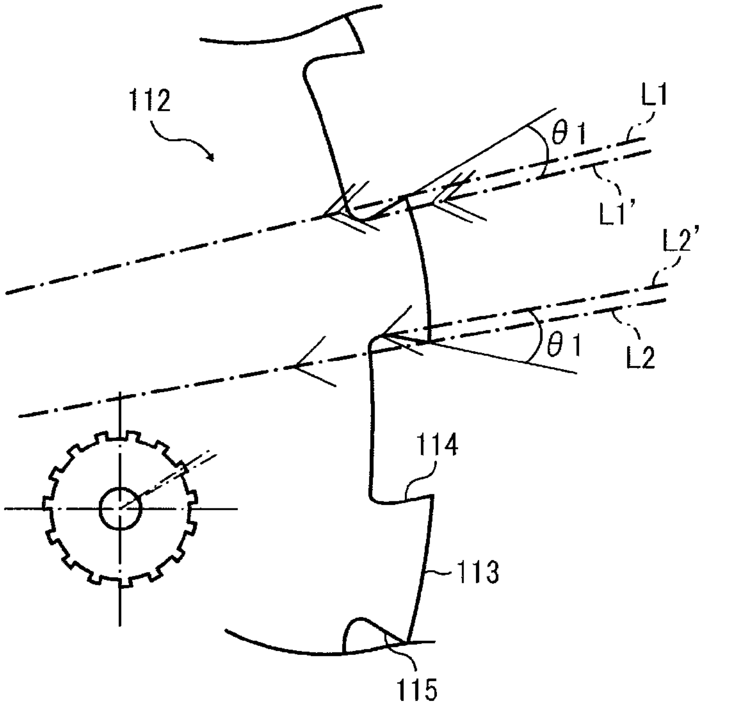
FIGS. 9A and 9B are a partially enlarged diagram schematically illustrating the ratchet and the regulation lever.
Figure 9B:
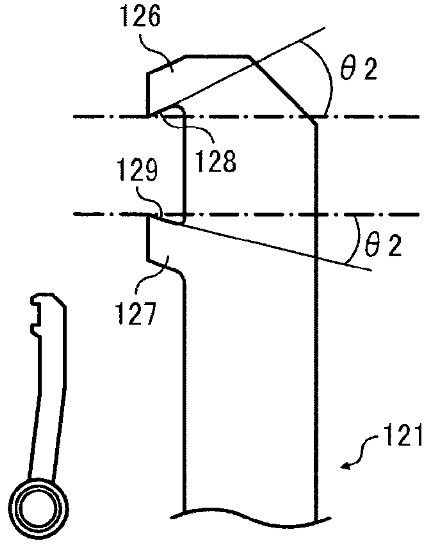

As illustrated in FIG. 8, when the ratchet 112 is locked, a straight line is drawn horizontally from the center of rotation of the ratchet 112. Subsequently, when an angle $\theta 3$ between the straight line described above and a line connecting the center of rotation of the lever 121 and the center of contact of the plane of the tooth 113 with the projection of the lever 121 is 90 degrees, the surface profile of the tooth 113 of the ratchet 112 and the projections of the lever 121 is determined as illustrated in FIGS. 9A and 9B. As illustrated in FIG. 9A, lines L1' and L2' are drawn from a tooth fillet of the straight plane of the tooth 113 parallel to lines L1 and L2 connecting from the center of rotation of the ratchet 112 and the tip of the tooth 113. An angle between the lines L1' (L2') and the plane of the tooth 113 is $\theta 1$.

As for the lever 121, as illustrated in FIG. 9B, an angle $\theta 2$ between a horizontal line indicated by a dash-dot line and the normal rotation restriction plane 128 of the normal rotation restriction projection 126 and the reverse rotation restriction plane 129 of the reverse rotation restriction projection 127 coincides with the angle $\theta 1$, where the angle of the horizontal line is 0 degree. ($\theta 1=\theta 2$)

With this configuration, as illustrated in FIGS. 7A and 7B, the plane of the tooth 113 of the ratchet 112 contacts the plane of either the projection 126 or the projection 127 over a plane, not in a point, in both rotation directions. In other words, the plane of the tooth 113 of the ratchet 112 contacts reliably the plane of the projection 126 or 127 of the lever 121, no matter which direction the ratchet 112 rotates.

As described above, the angle θ1 of the plane of the tooth 113 coincides with the angle θ2 of the plane of the lever 121. With this configuration, when the lever 121 meshes with the ratchet 112, the lever 121 can slide smoothly towards the center of the ratchet 112 along the surface of the tooth 113 so that the plane of the tooth 113 of the ratchet 112 and the plane of the projection of the lever 121 can contact reliably. Accordingly, the planetary gear clutch mechanism 100 can accommodate reliably bidirectional rotation of the drive unit downstream therefrom.

As illustrated in FIGS. 7A and 7B, the lever 121 includes the plurality of projections (according to the present illustrative embodiment, at least 2 projections, that is, the projections 126 and 127) that meshes with the tooth 113 of the ratchet 112. Depending on the direction of rotation of the ratchet 112, a different plane of the projection of the lever 121 contacts the tooth 113. As the different plane of the projection of the lever 121 contacts the ratchet 121 in accordance with the direction of rotation of the ratchet 112, abrasion resistance and durability of the lever 121 are enhanced. More specifically, depending on the direction of rotation of the ratchet 112, either the normal rotation restriction projection 126 or the reverse rotation restriction projection 127 contacts the plane of tooth 113 of the ratchet 112, thereby enhancing the durability of the planetary gear clutch mechanism 100 as a whole.

Figure 10A:
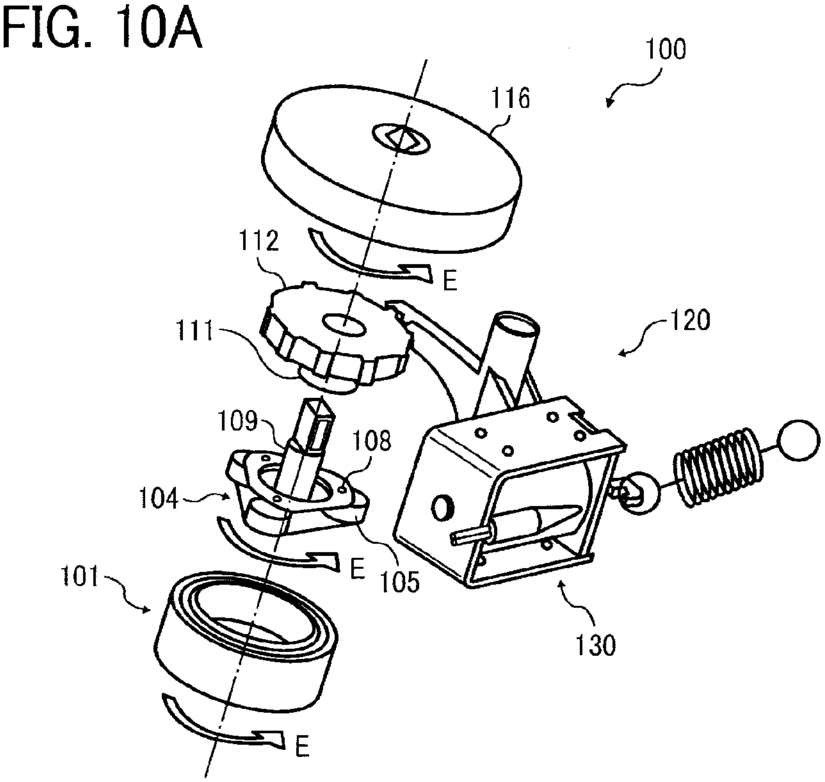
FIG. 10A is a perspective view schematically illustrating the planetary gear clutch mechanism during normal rotation.
Figure 10B:
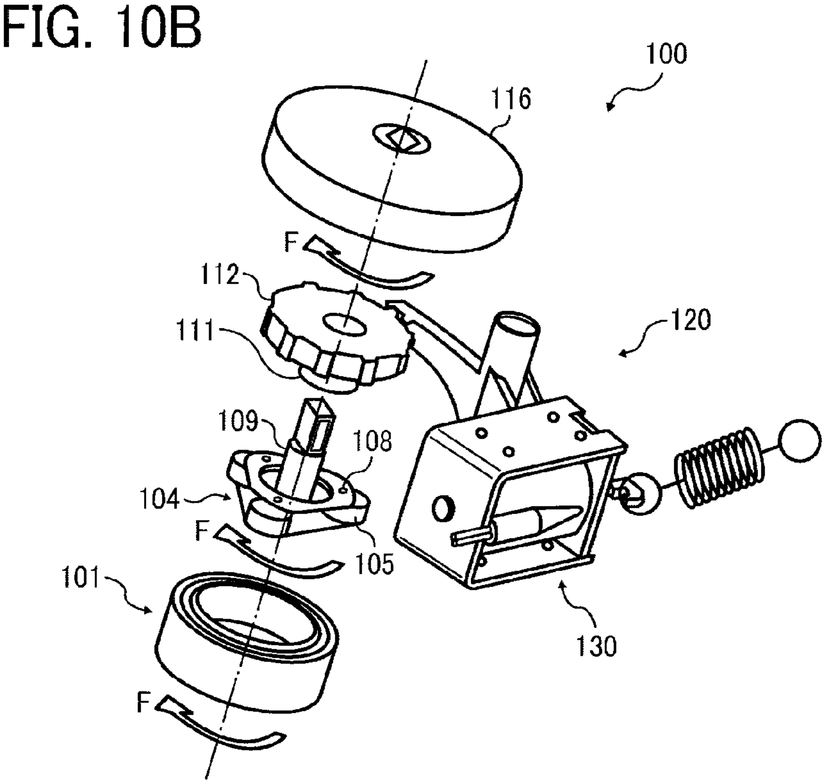
FIG. 10B is a perspective view schematically illustrating the planetary gear clutch mechanism during reverse rotation.

With reference to FIGS. 10A and 10B, a description is provided of movement of the planetary gear unit 110 and the output gear 116 of the planetary gear clutch mechanism 100. FIG. 10A is a perspective view schematically illustrating the planetary gear clutch mechanism 100 during normal rotation. FIG. 10B is a perspective view schematically illustrating the planetary gear clutch mechanism 100 during reverse rotation.

Upon normal rotation as illustrated in FIG. 2A, the outer gear 101 rotates in the direction indicated by arrow E, and the carrier 104 rotates in the same direction due to revolution of the planetary gear 105. The output gear 116 connected to the carrier 104 by the output shaft 109 rotates in the same direction. Upon reverse rotation as illustrated in FIG. 3A, the outer gear 101 rotates in the direction indicated by arrow F, and the carrier 104 rotates in the same direction due to revolution of the planetary gear 105. The output gear 116 connected to the carrier 104 by the output shaft 109 rotates in the same direction.

According to the present illustrative embodiment, a solenoid is employed as the actuator 131, and a spring is employed as the elastic member 135. As described above, one end of the elastic member 135 is hooked directly on the notch 125 of the input portion 124 of the lever 121. Alternatively, the elastic member 135 may be disposed on the periphery of the plunger 132 of the actuator 131.

The solenoid as the actuator 131 is turned on when the sun gear 111 is held stationary or unlocked, whichever duration is shorter. By contrast, the elastic member 135 is used when the sun gear 111 is held stationary or unlocked, whichever duration is longer. With this configuration, the total operating time of the actuator 131 (solenoid) can be reduced, thereby making the planetary gear clutch mechanism 100 energy efficient. Furthermore, according to the present illustrative embodiment, arrangement of the elastic member 135 is flexible, providing greater flexibility in the arrangement of parts and hence increasing versatility of the planetary gear clutch mechanism 100.

As described above, the developing roller drive gear train 90 of the image forming apparatus 200 includes the planetary gear clutch mechanism 100 that can accommodate bidirectional rotation of the developing roller 4 and the developing agent mixing screws 5 and 6. Accordingly, the developing roller 4 and the developing agent mixing screws 5 and 6 can rotate in both directions and stop at desired timing. The actuator 131 to change the movement of the developing roller 4 and the developing agent mixing screws 5 and 6 is activated when rotation of the sun gear 111 is held stationary or unlocked, whichever duration is shorter, thereby reducing consumption of power.

One of the planes of the plurality of teeth 113 of the ratchet 112 contacts reliably one of the planes of the projections 126 and 127 of the lever 121 no matter which direction the ratchet 112 rotates. In other words, when the ratchet 112 rotates in either direction, the plane of either the projection 126 or the projection 127 of the lever 121 contacts reliably the plane of the tooth 113. With this configuration, regardless of the direction of the torque input to the outer gear 101 to rotate the drive unit downstream from the planetary gear clutch mechanism 100 in both directions, rotation of the ratchet 112 (the sun gear 111) can be locked and unlocked, thereby accommodating bidirectional rotation of the drive unit downstream from the planetary gear clutch mechanism 100.

The surface profile of the projections of the lever 121 and the ratchet 112 is configured such that the planes of the projections of the lever 121 that contact the planes of the tooth 113 of the ratchet 112 are oblique so that the lever 121 can slide smoothly toward the fillet of the tooth 113. Accordingly, regardless of the direction of the torque exerted to the outer gear 101, rotation of the ratchet 112 is regulated reliably and rotation of the sun gear 111 is held stationary.

The combination of the actuator 131 and the elastic member 135 enables the lever 121 to mesh with and separate from the ratchet 112 with effective use of power. Accordingly, regardless of the direction of the torque exerted to the outer gear 101, the ratchet 112, that is, the sun gear 111 can be locked and unlocked reliably, hence accommodating bidirectional rotation of the drive unit downstream from the planetary gear clutch mechanism 100.

According to the illustrative embodiment, the actuator 131 is turned on when the sun gear 111 is held stationary or unlocked, whichever duration is shorter. By contrast, the elastic member 135 is used when the sun gear 111 is held stationary or unlocked, whichever duration is longer, thereby reducing required power of the planetary gear clutch mechanism 100 as a whole.

The foregoing descriptions pertain to the planetary gear clutch mechanism 100 employed in the developing roller drive gear train 90 that enables the developing roller 4 and the developing agent mixing screws 5 and 6 in the developing unit 3 to rotate. However, the present invention is not limited to the above structure. The present invention is applicable to a drive transmission system which needs to accommodate bidirectional rotation of a drive unit disposed downstream therefrom.

The clutch mechanism according to the illustrative embodiment of the present invention includes a planetary gear mechanism, a rotation restriction target, a rotation restriction device, and a moving device. The planetary gear mechanism employed in the clutch mechanism includes an input element, an output element, a fixed element, and a plurality of planetary gears. The input element receives torque and is rotatably disposed on a shaft. The output element is coaxially disposed on the same shaft as the input element to output the torque. The fixed element is coaxially disposed on the same shaft as the input element and rotatable bidirectionally. The rotation restriction target includes a plurality of projections provided integrally on the fixed element, and the projections include a planar surface at both sides of the projections in the direction of rotation of the fixed element. The rotation restriction device includes a plurality of projections having a planar surface to contact the planar surface of the projections of the rotation restriction target to lock rotation of the fixed element. The moving device includes an actuator to move the rotation restriction device to contact and separate from the rotation restriction target. The torque received by the input element is transmitted to downstream rotary devices in the direction of transmission of torque via the output element while the projection of the rotation restriction device meshes with the projection of the rotation restriction target. The torque received by the input element is not transmitted to the downstream rotary devices via the output element while the projection of the rotation restriction device does not mesh with the projection of the rotation restriction target.

The input element of the planetary gear mechanism comprises the outer gear. The output element comprises one of the sun gear and the carrier rotatably supporting the planetary gears. The fixed element comprises the other one of the sun gear and the carrier. The sun gear is rotatably disposed on the shaft. The plurality of planetary gears meshes with the sun gear. The outer gear meshes with the planetary gears. The outer gear, the sun gear, and the carrier are coaxial.

Alternatively, the input element of the planetary gear mechanism may comprise the sun gear; the output element may comprise one of the outer gear and the carrier; and the fixed element may comprise the other one of the outer gear and the carrier.

Still alternatively, the input element of the planetary gear mechanism may comprise the carrier; the output element may comprise one of the sun gear and the outer gear; and the fixed element comprises the other one of the sun gear and the outer gear.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A clutch mechanism, comprising:

a rotatable input element to receive torque;

an output element to output the torque;

a transmission element rotatable in a first direction and a second direction opposite to the first direction, including integrally a plurality of projections, the plurality of projections including a first planar surface and a second planar surface at each side of the projections in the direction of rotation of the transmission element;

a rotation restriction device including a first restriction surface and a second restriction surface to contact the first planar surface and the second planar surface of the projections of the transmission element, respectively, to lock rotation of the transmission element; and a moving device including an actuator to move the rotation restriction device to contact and separate from the projections of the transmission element, wherein the torque received by the input element is transmitted to downstream rotary devices in the direction of transmission of torque via the output element while the rotation restriction device engages the projections of the transmission element, wherein the torque received by the input element is not transmitted to the downstream rotary devices via the output element while the rotation restriction device is disengaged from the projections of the transmission element, wherein the first restriction surface contacts the first planar surface while the transmission element rotates in the first direction, and the second restriction surface contacts the second planar surface while the transmission element rotates in the second direction.

2. The clutch mechanism according to claim 1, further comprising a planetary gear mechanism, the planetary gear mechanism including a shaft an outer gear;

a sun gear rotatably disposed on the shaft;

a plurality of planetary gears to mesh with the sun gear and the outer gear; and a carrier rotatably supporting the plurality of planetary gears, wherein the input element comprises the outer gear, the output element comprises the carrier, and the transmission element comprises the sun gear, wherein the outer gear, the sun gear, and the carrier are coaxial.

3. The clutch mechanism according to claim 1, wherein the moving device includes an elastic member to move against the movement of the actuator.

4. The clutch mechanism according to claim 3, wherein the elastic member of the moving device comprises a spring, one end thereof attached directly to the rotation restriction device.

5. An image forming apparatus, comprising:

an image bearing member to bear an electrostatic latent image on a surface thereof;

a developing device to develop the electrostatic latent image formed on the image bearing member using a developing agent to form a toner image, the developing device including a developing agent bearing member to deliver the developing agent to the image bearing member; and a drive transmission device including the clutch mechanism of claim 1, to transmit a drive force to the image bearing member and to the developing agent bearing member.

* * * * *